United States Patent [19]
Mitchell, Jr.

[11] 3,800,056

[45]* Mar. 26, 1974

[54] PROCESS FOR MAKING PEANUT FLAKES

[76] Inventor: Jack H. Mitchell, Jr., Clemson University, Clemson, S.C. 29631

[*] Notice: The portion of the term of this patent subsequent to Sept. 5, 1989, has been disclaimed.

[22] Filed: Oct. 8, 1971

[21] Appl. No.: 187,837

Related U.S. Application Data

[63] Continuation-in-part of Ser. No. 839,673, July 7, 1969, Pat. No. 3,689,287.

[52] U.S. Cl. .................... 426/457, 426/142
[51] Int. Cl. ............................. A23l 1/36
[58] Field of Search ........... 99/126, 127, 128, 98; 426/457, 142

[56] References Cited
UNITED STATES PATENTS

| | | | |
|---|---|---|---|
| 3,689,287 | 9/1972 | Mitchell, Jr. | 99/126 |
| 3,317,325 | 5/1967 | Durst | 99/126 |
| 1,813,268 | 7/1931 | Bachler | 99/126 |
| 2,172,699 | 9/1939 | Cohn | 99/98 |
| 2,144,911 | 1/1939 | Cohn | 99/126 X |
| 3,630,747 | 12/1971 | Lowe et al. | 99/126 |
| 2,685,519 | 8/1954 | Moore | 99/126 X |
| 3,346,390 | 10/1967 | Pichel | 99/126 X |
| 1,447,018 | 2/1923 | Friedsam | 99/128 |
| 2,511,119 | 6/1950 | Mitchell, Jr. | 99/128 |
| 3,543,823 | 12/1970 | Keen | 99/98 X |

FOREIGN PATENTS OR APPLICATIONS

| | | | |
|---|---|---|---|
| 682,230 | 3/1964 | Canada | 99/126 |

Primary Examiner—Tim R. Miles
Assistant Examiner—Steven L. Weinstein
Attorney, Agent, or Firm—Allison C. Collard

[57] ABSTRACT

This invention relates to a process for converting peanuts into thermostable, bland flavored, precooked full-flat flakes, which includes the steps of steaming the unground peanuts, drying to a moisture level of two to three per cent, removing the skins and hearts, grinding the peanuts to a fine consistency, precooking the finely divided peanuts with water, and then drum drying the product.

9 Claims, No Drawings

PROCESS FOR MAKING PEANUT FLAKES

This is a continuation-in-part application of U.S. Ser. No. 839,673 filed July 7, 1969 issued on Sept. 5, 1972 as U.S. Pat. No. 3,689,287.

There are many processes known in the art dealing with the processing of peanuts due to the fact that peanuts have a high nutritions value. They are rich in the three most valuable components of food stuffs, namely, oil, protein and carbohydrate.

Most of the processes deal with the preparation of peanut butter which is traditionally made by shelling peanuts, roasting them and after blanching, grinding the product to a pasty consistency. Since the contents in oil average about 47 percent, and those of carbohydrate average 20 percent, and protein average about 26 percent each, the peanut butter obtained as described is one of the most popular spreads.

Another product made from peanuts is peanut flour. This is distinguished from peanut butter by the lower oil content since in the preparation of flour, an oil extraction takes place for the purpose of making a free-flowing product by grinding the defatted nuts. Peanut flour has many uses as an addition to other food stuffs, because though poorer in oil, it is high in protein and carbohydrate.

In U.S. Pat. No. 2,511,119, the inventor has described the preparation of nut emulsions which were suitable as bases for various products, either for beverages or similar to ice cream. In that patent, drying was not involved, and the question of rancidity in storage due to oxidation of the oil fraction did not come up. Heating to high temperatures of 220°F and more was not contemplated.

Contrary to processes already known in the art, the present invention relates to a process for converting peanuts into precooked full fat flakes which are thermostable, bland flavored and pathogen free. The process includes the steps of steaming the unground peanuts, drying to a moisture level of 2 to 4 percent, removing the skins and hearts, grinding the peanuts to a fine consistency, cooking the finely divided peanuts with water, and then drum drying the product.

The process utilizes the entire shelled peanut with the exception of the hearts and skins, the former being the source of bitter flavor. The oil need not be removed, contributing to the economical conversion to a food product rich in protein and high in calories. The present process produces a product which is intended to result in an expansion of the utilization of peanuts. The flakes are useful in formulating simulated meat items or may serve as a meat, poultry and fish product extender. They also have other applications. The product should prove particularly useful in areas which lack sufficient animal protein supplies.

Although the flakes may contain as much as 46 to 54 percent oil, depending upon the composition of the peanuts used, they do not present an oily appearance unless they are ground to a fine state. If this is done, free oil is released and the product assumes the characteristics of a paste. If materials, such as low-fat peanut flour, precooked potatoes, rice, or other substances of low oil content are incorporated with the cooked finely ground peanut-water mixture just prior to drum drying, the resultant flakes have a reduced oil content, depending upon the relative quantities of each component. Such flakes may be reduced to a flour instead of a paste by grinding.

The present improved process involves precooking the raw ground peanuts with moist heat prior to drum drying. This precooking brings about a number of desirable changes relative to flavor in that it releases compounds having a somewhat unpleasant aroma. These compounds are removed during subsequent drum drying since they are volatile with the steam issuing from the thin layer of material coating the surfaces of the drums. This results in a flaked product of bland taste, free from raw, beany, or other objectionable flavor. The precooking also prevents oil leakage during drum drying, contributes to stability of the finished product during storage, and produces a desired texture of the flake. It further develops an optimum consistency for drum drying and destroys pathogenic organisms.

The material after drum drying may be used in formulating a wide variety of foods. The compounds responsible for objectionable flavors when raw ground peanuts are heated with water have already been released when the precooked drum-dried flakes are used in food formulation and are not reformed even though such foods are heat processed.

The precooking prior to drum drying results in stabilization of the oil in the peanut flakes. Since peanuts have an average oil composition of about 46 percent, it might reasonably have been expected that rancidity would develop quickly because of the large amount of exposed surface in the flakes. This does not occur.

This stability, however, was not achieved in flakes prepared from peanut material which was not precooked, as shown in appended Table I. It is not necessary, however, to precook to 240°F to achieve this stability. Precooking finely ground peanut-water mixtures for about 2.5 minutes at 203°F (95°C) also provided a product which was dried into flakes of improved stability. (See Table II). Steaming the raw shelled whole peanuts at atmospheric pressure, essentially at a temperature of 212°F prior to grinding and precooking the peanuts is very effective as a preheat treatment to improve stability of the flakes (see Tabe III). Precooking at 158°F (70°C) is unsatisfactory (Table II) in stabilizing the oil against oxidation. Experiments indicate that precooking to at least 203°F (95°C) for 2.5 minutes is necessary to improve stability on storage; but in consideration of optimum stability and other quality factors related to texture, it is preferable to first preheat the raw peanuts to 212°F with steam for about 15 minutes to inactivate enzymes, prior to the precooking step. The addition of an antioxidant and a synergist (butylated hydroxyanisole and citric acid) to a non-preheated peanut-water mixture did not result in producing the stabilizing effect achieved by precooking (Table I).

Any grinding procedure which produces a desired fineness of grind may be used. For example, after the red skins and hearts are removed, the dried peanuts were ground in a 3 inch "Premier Colloid Mill" equipped with a carbonumdum rotor and stator adjusted to allow about 0.010 inch between the grinding surfaces. Before grinding, the moisture content of the peanuts should be reduced, for best results, to about 2 to 4 percent. However, the utility of the present method is maintained when the moisture content of the peanuts is reduced to approximately one to six percent. The peanuts should not be roasted or heated to the point that roasted peanut flavors develop. This can be accomplished in a dehydrator operated at atmospheric pressure at about 225°F for about one to two hours. After grinding in the colloid mill, the particles are of such a size that, if oil free, they would all pass through a standard 140-mesh sieve. These particles may be said to be "oil free" to indicate a method of measuring the reduction in size which was accomplished in grinding the peanuts. For the purpose of this process, other grinding equipment may also be used. It is preferable that less than 5 percent of the oil-free solids be retained by a 200-mesh screen.

The following examples define the essential steps in carrying out the process:

EXAMPLE I

1. Steam raw shelled peanuts with live steam at atmospheric pressure to expose the peanuts to a temperature of about 212°F for about 15 minutes. The peanuts are then dehydrated to a moisture content of about 2 to 4 percent in a mechanical dehydrator. After the steamed peanuts have been dried to a moisture level of about 2 to 4 percent, red skins and hearts, the latter a source of bitter flavor, are removed, and the cotyledons are ground to a fine state which releases essentially all of the oil from the individual cells which compose the cotyledons. As an indication of the degree of fineness of grind which is desired, it is preferred that less than 5 percent of the oil-free solids be retained by a 200-mesh screen. To achieve the desired type of particle, it is necessary that the moisture level of the peanuts be in the range of 2 to 4 percent at the time of grinding.

2. Mix finely ground peanuts with about 2 to 3 parts of water and heat to about 203°F (95°C) for about 2 to 3 minutes with flowing steam. The exact amount of water to be used depends upon the cooking time and temperature, and should be adjusted to give a consistency of the cooked material which yields the best results in the drum drying step (see Table IV). The preferred consistency was a flow rate of between 2 and 12 units in 10 seconds, as measured on a Bostwick consistometer. This consistency was satisfactory for our small drum dryer. It will be understood that the greater the Bostwick unit, the more fluid the material. Cooking for 2 to 3 minutes at 203°F also effectively destroys pathogenic organisms.

3. Drum dry the precooked peanut material. The surfaces of the drums should be chrome plated or made of a material such that contamination of the product with copper, iron or other heavy metal does not occur. The space between the drums is adjusted to about 0.016 inch and the revolving speed to about 1 revolution per 18 seconds. A steam pressure of 80 to 90 pounds per square inch gave satisfactory results. Conditions of operation would need to be adjusted for commercial size equipment.

EXAMPLE II

1. Heat raw shelled peanuts at about 225°F in a dehydrator until the moisture content is reduced to about 2 to 4 percent. Remove red skins and hearts, and grind the cotyledons to a fine state, such that essentially all of the oil contained in the individual cells is released and a free-flowing paste is obtained. At this stage, less than 5 percent of the oil-free solids would be retained by a 200-mesh screen in a test of particle size.

2. Mix the finely ground peanuts with about 2 to 3 parts of water and cook the smooth mixture by injecting live steam. The temperature of the mixture should be maintained at about 203°F (95°C) for at least 3 to 5 minutes. During this cooking period, the consistency increases rapidly due to gelation of starch and denaturation of proteins. The exact quantity of water to be used in making up the finely ground peanut-water mixture depends upon the cooking time and the variety of peanuts used, but an important consideration is that the quantity of water be adjusted to give the consistency which performs best in the drum drying step, as indicated in Example I, step 2.

EXAMPLE III

1. Heat raw shelled peanuts at about 225°F in a dehydrator until the moisture content is reduced to about 2 to 4 percent. Remove red skins and hearts, and grind the cotyledons to a fine state, such that essentially all of the oil contained in the individual cells is released and a free-flowing paste is obtained, as in Example II, step 1.

2. Mix the finely ground peanuts with about 4 parts of water, by weight, and cook the smooth mixture under pressure in such a manner that all of the mixture reaches a temperature of about 240°F for at least 1 minute.

3. Drum dry the cooked peanut material as indicated in Example I, step 3.

EXAMPLE IV

Five Hundred grams of precooked full-fat peanut flakes were filled into a porous bag and placed in the extraction chamber of a Soxhlett Extractor. The oil was removed from the flakes by extraction with normal hexane. After removal of residual hexane from the flakes, they were essentially oil free, with a protein content of at least 60 percent.

EXAMPLE V

Five Hundred grams of essentially fat-free peanut flour, prepared from either solvent-extracted peanut flakes, hydraulically pressed peanuts, or solvent-extracted peanuts, was mixed with 4,000 milliters of water and 500 grams of finely ground unroasted peanuts. The mixture was passed through a colloid mill with carborundum head and rotor to insure smooth consistency. It was autoclaved at 240°F for 40 minutes and drum dried at 80 pounds per square inch steam pressure. Clearance between the rotating drums was 0.016 inch. The protein content of these flakes was about 46 percent, and the oil content was about 23 percent.

An increase in consistency occurs due to gelatinization of starch granules and coagulation of proteins. The amount of increase in consistency is related to the temperature and time of cooking, the state of subdivision of the peanuts, and the relative quantities of finely ground peanuts and water. Table IV shows that increasing quantities of water are required with increasing cooking temperatures to produce approximately the same consistency. This table also shows that little or no increase in consistency occurs when heating temperatures are 140°F and 158°F. Table V shows that the effect of cooking on consistency depends also on whether or not the peanuts are finely ground prior to or after cooking with water. When peanut halves were heated with water and then ground through the colloid mill and mixed with water in which they were heated, the consistency was much more fluid then when the peanuts were finely ground prior to precooking with water. For top feeding of the drum dryer, it is necessary that the mix be of suitable consistency.

Table VI shows that the cooking treatment influences the appearance and texture qualities of the flakes. Samples 1, 2 and 3 which received preheat treatments from none, to 176°F for 10 minutes, were generally brittle, with a coarse feel in the mouth when they were eaten. They were also somewhat oily and translucent because of apparent inability of the insufficiently heated proteins and carbohydrates to absorb all of the oil. As the cooking temperatures increased, samples 4, 5 and 6, the flakes became less oily, more opaque, and developed a smooth mouth feel. This effect is attributed to the gelatinization of starch granules and coagulation of proteins, with the resulting formation of a matrix within which the oil was fixed or absorbed. It is undesirable for the flakes to have an oily appearance and for most of the applications in which the flakes have been used in food product formulation, a smooth mouth feel is desired.

The rougher texture, or mouth feel, of flakes made from low-heat treated, finely ground peanut-water suspension, or mixture, is probably due to the fact that the protein coagulates in large agglomerates as it dries on the drum surfaces, whereas when the finely ground peanut-water mixture is subjected to greater preheating, the protein and starch undergo changes as individual particles with the result that a different orientation is obtained during subsequent drum drying.

For use in simulated meat products of the bologna and weiner type, for cheese-like products, and for peanut-potato flakes, it is preferable for the flakes to have a smooth texture as judged by mouth feel. It is believed that the precooked full-fat flakes have excellent applications in formulating simulated meat items of the bologna and weiner type, either as an extender or when used as the major ingredient. Excellent results were also obtained when the flakes were used as an extender in the formulation of boneless chicken roll along with either ground or diced chicken meat. The simulated or extended meat items have been processed in suitable flexible casing materials. An additional application of the precooked full-fat peanut flakes is as an extender in chicken or tuna salad. The flakes have also been used as the major ingredient in formulation of an imitation chicken salad and sandwich filling.

For some food applications, a low oil, high protein peanut flake may be desirable. Such flakes may be readily prepared from the precooked full-fat peanut flakes by solvent extraction. The essentially oil-free flakes thus obtained are about 60 percent protein, are devoid of almost all flavor, and are white in color. They may be readily ground into flour and, when used as a supplement with wheat flour in making bread, gave a product with a higher acceptance rating than was obtained by using defatted peanut flour which had not been precooked.

TABLE I

Effect of Precook Treatment of Finely Ground Peanut-Water Mixture on Rancidity and Oxidation of Full-Fat Peanut Flakes During Storage

| | Storage at 100° F. | | | | | Storage at 145° F. | | Storage at 100° F. | |
|---|---|---|---|---|---|---|---|---|---|
| | Peroxide [1] | | | TBA [2] | | TBA [2] | | Acceptability [3] | |
| Precook or other treatment | 0 mo. | 3 mo. | 12 mo. | 0 mo. | 12 mo. | 0 wk. | 2 wk. | 0 mo. | 12 mo. |
| None | 3.0 | 20 | 300 | 92 | 14 | | | 8.0 | [6] 3.0 |
| Do | 3.0 | | 289 | 94 | 18 | 94 | 50 | 8.3 | [6] 3.0 |
| 20 minutes at 240° F | 2.5 | | 82 | 90 | 87 | 93 | 85 | 8.0 | 6.6 |
| Do | 3.0 | | [5] 40 | 94 | 90 | | | 8.0 | 7.0 |
| No preheating plus 0.017% BHA[4] plus 0.01% citric acid | 3.0 | | 149 | 90 | 87 | | | 8.2 | [6] 4.0 |

[1] Peroxide as milliequivalents of peroxide oxygen/1,000 grams of extracted oil.
[2] Thiobarbituric acid value as percent transmission at 530 milligrams.
[3] Acceptability on 9-point scale ranging from 1 (dislike extremely) to 9 (like extremely).
[4] Butylated hydroxyanisole (antioxidant).
[5] Ten months storage.
[6] Rancid.

TABLE II

Oxidation of Full-Fat Peanut Flakes During Storage at 100° F. Influenced by Precooking of Finely Ground Peanut-Water Mixture

| Precooking temperature, °F. | Precooking time, min. | Peroxide value of peanut flakes meq. peroxide oxygen/kg. oil | | | | | |
|---|---|---|---|---|---|---|---|
| | | Initial | 4 wk. | 8 wk. | 16 wk. | 24 wk. | 32 wk. |
| None | 0.0 | 8.6 | | 20.0 | 35.8 | 59.6 | 152.5 |
| 203–205 | 0.5 | 3.3 | | 11.2 | 28.3 | 49.1 | 88.8 |
| 203–205 | 1.0 | 3.3 | | 8.0 | 19.1 | 43.7 | 49.8 |
| 203–205 | 2.5 | | 9.5 | 11.4 | 16.1 | 18.0 | 32.4 |
| 203–205 | 5.0 | | 9.3 | 12.9 | 15.1 | 30.5 | 39.0 |
| 203–205 | 10.0 | | 7.9 | 8.1 | 12.6 | 19.7 | 33.6 |
| 203–205 | 15.0 | | 9.1 | 9.6 | 10.9 | 20.9 | 31.8 |
| 203–205 | 20.0 | | 7.6 | 8.1 | 9.4 | 18.5 | 32.7 |
| 203–205 | 30.0 | | 7.7 | 7.2 | 8.0 | 12.7 | 20.9 |
| None | 0.0 | 9.6 | 12.3 | 16.9 | 45.3 | 74.7 | 393.2 |
| 185 | 0.5 | | | 19.4 | 34.1 | 73.0 | 104.2 |
| 185 | 1.0 | | | 18.0 | 34.7 | 61.4 | 93.4 |
| 185 | 5.0 | 6.6 | | 4.8 | 12.2 | 24.9 | 38.5 |
| 185 | 10.0 | 7.7 | | 11.3 | 14.8 | 19.5 | 41.5 |
| 185 | 20.0 | 6.3 | | 12.5 | 21.2 | 33.6 | 57.1 |
| 185 | 30.0 | 6.3 | | 6.4 | 8.2 | 11.0 | 13.8 |
| 185 | 40.0 | 6.6 | | 7.9 | 9.5 | 10.2 | 18.2 |
| 185 | 50.0 | 6.2 | | 8.0 | 8.0 | 10.9 | 15.3 |
| 185 | 60.0 | 6.3 | | 6.2 | 7.9 | 10.6 | 15.6 |
| 158 | 0.5 | 11.6 | | 27.1 | 32.7 | 52.6 | 63.3 |
| 158 | 1.0 | 11.7 | | 23.5 | 41.6 | 61.6 | 82.5 |
| 158 | 2.5 | 16.8 | | 20.1 | 37.0 | 61.0 | 85.8 |
| 158 | 5.0 | 10.9 | | 18.2 | 29.0 | 48.5 | 58.0 |
| 158 | 10.0 | 12.8 | | 25.1 | 41.6 | 62.1 | 71.3 |

TABLE III

Oxidation of full-fat peanut flakes during storage at 100°F as influenced by steaming of raw whole peanuts

| Steaming Temperature F° | Steaming Time Minutes | Peroxide Value of Peanut Flakes Meq peroxide oxygen/Kg oil | | | |
|---|---|---|---|---|---|
| | | Initial | 8 wk | 16 wk | 24 wk |
| 212 | 2 | 1.8 | 36.9 | 34.9 | 79.0 |
| " | 5 | 4.8 | 12.8 | 26.0 | 97.2 |
| " | 10 | 4.7 | 10.5 | 23.6 | 89.8 |
| " | 15 | 4.3 | 6.9 | 8.3 | 18.8 |
| " | 20 | 3.3 | 4.3 | 4.2 | 10.3 |
| " | 30 | 3.5 | 2.5 | 2.7 | 10.6 |
| 212* | 2 | 1.8 | 34.5 | 38.1 | 86.0 |
| "* | 5 | 4.8 | 12.1 | 30.0 | 88.3 |
| "* | 10 | 4.7 | 17.5 | 36.4 | 119.9 |
| "* | 15 | 4.3 | 5.3 | 7.0 | 26.7 |
| "* | 20 | 3.3 | 2.7 | 3.6 | 7.1 |
| "* | 30 | 3.5 | 2.5 | 2.7 | 8.6 |

* 0.01% Butylated hydroxyanisole (BHA) and 0.01% citric acid added to the finely ground peanut-water mixture

TABLE IV

Quantity of Water Required to be Added to 250 Grams Finely Ground Peanuts to Produce Consistencies Within Limits Indicated When Precooking Is at Temperatures Shown.

| Sample No. | Precooking Temp. for 10 min. | Consistency of Precooked Peanut-Water Mixture Bostwick units /10 seconds* | Cubic Centimeters of Water Needed to Give Consistency Indicated |
|---|---|---|---|
| 1 | 140°F (60°C) | More than 24.0 | 500 |
| 2 | 158°F (70°C) | More than 24.0 | 500 |
| 3 | 158°F (70°C) | 9.0 | 250 |
| 4 | 176°F (80°C) | 7.0 | 500 |
| 5 | 194°F (90°C) | 8.5 | 575 |
| 6 | 203°F (95°C) | 7.5 | 610 |
| 7 | 212°F (100°C) | 7.5 | 625 |
| 8 | 221°F (105°C) | 7.0 | 650 |
| 9 | 240°F (115°C) | 7.2 | 890 |

TABLE V

Effect of Pregrinding Peanuts on Consistency of Autoclaved Peanut-Water Mixture

| Sample Preparation | Precooking Treatment | Consistency of Precooking Peanut-Water Mixture Bostwick units /10 seconds |
|---|---|---|
| 100 grams colloid-milled Spanish peanuts + 400 ml. water | 240°F for 20 min. | 4.5 |
| 100 grams blanched Spanish peanut halves + 400 ml. water** | 240°F for 20 min. | More than 24.0 |
| 100 grams blanched Planters' peanut halves + 400 ml. water** | 240°F for 20 min. | 16.0 |

** These samples were ground through the colloid mill after the precooking treatment at 240°F.

TABLE VI

Effect of Temperature of Precooking Finely Ground Peanut-Water Mixture on Quality of Full-Fat Peanut Flakes

| Sample No. | Precooking temperature | Appearance of full-fat peanut flakes | Physical characteristics of full-fat peanut flakes |
|---|---|---|---|
| 1 | None | Lacy, oily | Brittle, very coarse mouth feel. |
| 2 | 158° F.(70° C.) | Translucent, oily | Brittle, coarse mouth feel. |
| 3 | 176° F.(80° C.) | Somewhat translucent, oily. | Do. |
| 4 | 203° F.(95° C.) | Less translucent and oily than samples 1 and 2. | Smoother mouth feel than 1, 2 and 3. |
| 5 | 212° F.(100° C.) | Opaque, white, not oily. | Smooth mouth feel. |
| 6 | 240° F.(115° C.) | do | Very smooth mouth feel. |

I claim:

1. A method of making a bland-flavored, thermostable peanut flake in which the starch has been gelatinized, the proteins coagulated by heat, the enzymes inactivated and pathogenic bateria destroyed, comprising the steps of;
   heating shelled raw peanuts with live steam at a temperature of about 212°F for about 15 minutes,
   drying the steamed peanuts to a moisture content of about 3 to 3.5 percent at a temperature which does not result in browning or roasting,
   removing brown skins and hearts and grinding to a particle size such that about 85 percent of the particles will pass through a standard 325 mesh sieve and 95 percent through a standard 200 mesh sieve,
   mixing the finely ground peanuts with 1 to 4 parts of water by weight to form a smooth suspension of solid particles and an emulsion of oil in water and heating this material to about 203°F (95°C) for about 1 to 5 minutes, and
   drum drying said heated material in such a manner that flakes having a thickness of about 0.005 inch and a moisture content of about 1 to 2 percent are obtained.

2. A process for converting peanuts into thermostable, bland-flavored precooked full-fat flakes, comprising the steps of steaming shelled unground peanuts at about 212°F approximately 15 minutes to inactivate enzymes, drying the steamed peanuts to a moisture content of from 1 to 6 percent, removing the skins and hearts, grinding the peanuts to a fine consistency, mixing these finely ground peanuts with from 1 to 4 parts by weight of water to form an emulsion-suspension of oil droplets in water, and heating the resulting mixture between 200°F to 250°F from 1 to 60 minutes to bring about complete gelatinization of the starch molecules and hydration and expansion of proteins, and drum drying the resultant material to form flakes so that the emulsified oil will be entrapped and absorbed on and enclosed in a matrix of protein and carbohydrate material protecting the oil against oxidation during storage of the flakes.

3. The process as defined in claim 1, wherein the particle size of the ground peanuts is small enough so that substantially all particles can pass through a standard (U.S. Sieve Series) 140-mesh screen.

4. The process as defined in claim 1, wherein the consistency of the heated peanut-water emulsion-suspension is such as to produce a flow rate of between 2 and 12 units in 10 seconds as measured on a Bostwick consistometer.

5. The process as defined in claim 1, wherein the precooking of the peanut-water emulsion-suspension is continued for at least 10 minutes at a temperature of about 203°F.

6. The process as defined in claim 1, wherein the step of heating the resulting emulsion-suspension to about 203°F comprises the use of flowing steam.

7. The process as defined in claim 1, wherein the moisture content of the finished product is between 1 and 2 percent.

8. The process as defined in claim 1, wherein the drying of the emulsion-suspension is performed on heated drums, wherein the space between the drums is sufficiently small so that the material coats the drum surfaces evenly and is dried prior to removal from the drums.

9. The process as defined in claim 8, wherein the drying of the suspension is performed on heated drums, wherein the space between the drums is about 0.016 inch, the drums being heated by steam pressure of between 80 and 90 pounds per square inch.

* * * * *